US010109133B2

(12) United States Patent
Frankenberger et al.

(10) Patent No.: US 10,109,133 B2
(45) Date of Patent: Oct. 23, 2018

(54) APPARATUS AND METHOD FOR CHECKING VALUE DOCUMENTS, PARTICULARLY BANK NOTES, AND VALUE DOCUMENT HANDLING SYSTEM

(71) Applicant: GIESECKE & DEVRIENT GMBH, München (DE)

(72) Inventors: Jörg Frankenberger, Markt Schwaben (DE); Thomas Giering, Kirchseeon (DE); Wolfgang Rauscher, Parkstetten (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 15/521,376

(22) PCT Filed: Oct. 23, 2015

(86) PCT No.: PCT/EP2015/002120
§ 371 (c)(1),
(2) Date: Apr. 24, 2017

(87) PCT Pub. No.: WO2016/062409
PCT Pub. Date: Apr. 28, 2016

(65) Prior Publication Data

US 2017/0309106 A1 Oct. 26, 2017

(30) Foreign Application Priority Data

Oct. 24, 2014 (DE) ........................ 10 2014 015 746

(51) Int. Cl.
*G01D 7/06* (2006.01)
*G07D 7/06* (2006.01)
(Continued)

(52) U.S. Cl.
CPC ............ *G07D 7/06* (2013.01); *G07D 7/1205* (2017.05); *G07D 7/181* (2017.05); *G07D 7/187* (2013.01); *G07D 7/20* (2013.01); *G07D 7/00* (2013.01)

(58) Field of Classification Search
CPC ........... G07D 7/06; G07D 7/20; G07D 7/181; G07D 7/187; G07D 7/00
See application file for complete search history.

(56) References Cited

U.S. PATENT DOCUMENTS 8,077,231 B2 * 12/2011 Miyashita .............. G02B 5/008 348/272
8,358,318 B2 * 1/2013 Edge ........................ G09G 5/02 345/589
(Continued)

FOREIGN PATENT DOCUMENTS

DE 102008064389 A1 6/2010
DE 102011016509 A1 10/2012
(Continued)

OTHER PUBLICATIONS

German Search Report for corresponding German Application No. 102014015746.6, dated May 11, 2015.
(Continued)

*Primary Examiner* — Dominic J Bologna
(74) *Attorney, Agent, or Firm* — Workman Nydegger

(57) ABSTRACT

An apparatus, a corresponding method, and value-document processing system for checking value documents that has at least two radiation sources for giving off electromagnetic radiation with which a value document is irradiated, at least one sensor for capturing the electromagnetic radiation emanating from the value document, and generating corresponding sensor signals. The apparatus has an evaluation device configured to derive from the sensor signals corrected sensor signals taking into account at least one spectral property of
(Continued)

the electromagnetic radiation of the at least two radiation sources. The sensor signals corrected in this way reproduce the actual reflection or transmission behavior of the value document substantially more precisely than the uncorrected sensor signals. Disturbing remission or transmission artifacts may be attributed to so-called auxiliary emissions of the radiation sources are eliminated or at least reduced.

18 Claims, 3 Drawing Sheets

(51) Int. Cl.

| | |
|---|---|
| ***G07D 7/1205*** | (2016.01) |
| ***G07D 7/181*** | (2016.01) |
| ***G07D 7/187*** | (2016.01) |
| ***G07D 7/20*** | (2016.01) |
| *G07D 7/00* | (2016.01) |

(56) References Cited

U.S. PATENT DOCUMENTS 8,593,476 B2* 11/2013 Demos .................... G01J 3/02
345/589
9,128,055 B2* 9/2015 Sekino ............... G01N 21/6408
9,418,499 B2 8/2016 Rauscher et al.
2003/0231785 A1* 12/2003 Rhoads ............ G06F 17/30876
382/100
2004/0051862 A1* 3/2004 Alcock ............... G01N 21/474
356/71
2006/0017957 A1* 1/2006 Degott .................... B41M 3/14
358/1.14
2006/0251320 A1* 11/2006 Diederichs .......... B41F 33/0036
382/165
2011/0187095 A1* 8/2011 Anouar ............... G07D 7/1205
283/70
2014/0125968 A1 5/2014 Rauscher et al.

FOREIGN PATENT DOCUMENTS

EP 1403333 A1 3/2004
EP 1857985 A1 11/2007
EP 2308031 A1 4/2011

OTHER PUBLICATIONS

International Search Report for corresponding International PCT Application No. PCT/EP2015/002120, dated Feb. 12, 2016.
Zhang et al., "Estimation of Reflectance from Camera Responses by the Regularized Local Linear Model," Optics Letters, Oct. 1, 2011, pp. 3933-3935, vol. 36, No. 19.

* cited by examiner

APPARATUS AND METHOD FOR CHECKING VALUE DOCUMENTS, PARTICULARLY BANK NOTES, AND VALUE DOCUMENT HANDLING SYSTEM

BACKGROUND

This invention relates to an apparatus and a method for checking value documents, in particular bank notes, and a value-document processing system.

In bank-note processing systems, properties of bank notes, such as e.g. printed image, denomination, authenticity and condition, are ascertained by capturing physical properties of the bank notes by means of sensors and evaluating the thereby generated sensor data.

For checking the bank notes, their remission and/or transmission properties are often utilized. For this purpose, respectively one bank note is irradiated with the light of one or several light sources and the light remitted, i.e. diffusely reflected, or transmitted by the bank note is captured by means of one or several sensors. Depending on the kind of light sources used, the remission or transmission curves ascertained in this way may deviate from the actual remission or transmission behavior of the bank note. For example, when light-emitting diodes (LEDs) are used as light sources, artifacts may occur in particular regions of the remission or transmission curves, which do not correspond to the actual properties of the bank note.

SUMMARY

It is an object of the present invention to state an apparatus, a method and a value-document processing system, with which the reflection and/or transmission properties of value documents can be ascertained as precisely as possible.

The apparatus according to the invention for checking value documents, in particular bank notes, has: at least two radiation sources for giving off electromagnetic radiation with which a value document is irradiated; at least one sensor for capturing the electromagnetic radiation emanating from the value document, in particular directly or diffusely reflected and/or transmitted by the value document, and generating corresponding sensor signals, with components assigned to the radiation sources; an evaluation device which is configured to derive corrected sensor signals from the sensor signals generated by the at least one sensor taking into account at least one spectral property of the electromagnetic radiation of the at least two radiation sources, upon deriving the corrected sensor signals there being formed at least one linear combination from the sensor signals' components assigned to the different radiation sources.

The method according to the invention for checking value documents, in particular bank notes, has the following steps: irradiating a value document with electromagnetic radiation of at least two radiation sources; capturing the electromagnetic radiation emanating from the value document, in particular directly or diffusely reflected and/or transmitted by the value document, and generating corresponding sensor signals, with components assigned to the radiation sources; deriving corrected sensor signals from the sensor signals generated by the at least one sensor taking into account at least one spectral property of the electromagnetic radiation of the at least two radiation sources, upon deriving the corrected sensor signals there being formed at least one linear combination from the sensor signals' components assigned to the different radiation sources.

The value-document processing system according to the invention has at least one apparatus for processing, in particular conveying and/or counting and/or sorting, value documents, in particular bank notes, and is characterized by the apparatus according to the invention for checking value documents.

The invention is based on the idea that the reflection or transmission signals generated upon capturing the light reflected and/or transmitted by the value document by means of sensors, which signals preferably together represent a spectral reflection and/or transmission signal pattern, are subjected to a correction in which corrected reflection or transmission signals, which preferably together represent a corrected spectral reflection or transmission signal pattern, are obtained. Upon the correction of the reflection or transmission signals at least one spectral property of the electromagnetic radiation given off by at least two radiation sources is utilized.

The spectral property of the electromagnetic radiation taken into account may here refer to any property, in particular to the intensity, of the electromagnetic radiation given off by the radiation source at one or several wavelengths or in one or several wavelength regions. For example, the spectral property of the electromagnetic radiation taken into account refers to a value for the radiation intensity of a radiation source in the region of a first wavelength of a main emission and to a corresponding value in the region of a second wavelength of a further emission which is also referred to as an auxiliary emission. In another example, the spectral property of the electromagnetic radiation taken into account refers to a value for the radiation intensity in the region of a first wavelength of a main emission as well as to several respective values in regions of further wavelengths of further emissions which are also referred to as auxiliary emissions.

However, alternatively or additionally, the spectral property may also refer to a wavelength-dependent intensity pattern in a broader wavelength region of the electromagnetic radiation, respectively emitted by the radiation sources, in which wavelength region in particular the main emission and the auxiliary emission or the auxiliary emissions are included.

In the sensor signals' correction according to the invention, however, the spectral property of the electromagnetic radiation can also be taken into account in the form of parameters which are derived from the above-mentioned properties, in particular from the intensity values at particular wavelengths or in certain wavelength regions, such as e.g. quotients, differences or sums from the stated intensity values.

In a preferred embodiment, with sequential illumination of the value document to be checked by the at least two light sources with main emissions in different wavelength regions, the spectral property of at least one light source can be taken into account when evaluating the sensor signals.

This achieves in a simple and reliable manner that the corrected reflection or transmission signals match the actual remission or transmission behavior of the value document substantially better than without correction. In particular, this eliminates or at least reduces a possible influence on account of the kind of the light sources respectively used, such as e.g. LEDs. Altogether, the invention thereby allows a substantially more precise ascertaining of the reflection and/or transmission properties of value documents.

The at least one spectral property of the electromagnetic radiation of the at least two radiation sources is preferably given by at least one spectral distribution of the electromagnetic radiation of the at least two radiation sources. The spectral distribution of a $k^{th}$ (k=n) radiation source can here be stated preferably in the form of a continuous intensity pattern $S_k(\lambda)$ depending on the wavelength λ. Alternatively, the spectral distribution of the $k^{th}$ radiation source can also be given, however, by a plurality of intensity values $S_{ki}$ at discrete wavelengths $\lambda_i$ (i=1 . . . m). In a preferred embodiment, the spectral distributions of the n radiation sources differ from each other. Furthermore, the variant m=n is particularly preferred, because then it is particularly easy to determine the correction of the reflection or transmission signals. By taking into account the spectral distribution of the radiation sources the corrected sensor signals match the actual reflection or transmission pattern of the value document with even higher accuracy.

It is further preferred that at least one spectral distribution of the electromagnetic radiation of the radiation sources is given by a first spectral distribution of the electromagnetic radiation given off by the radiation sources and a second spectral distribution which is different from the first spectral distribution. Preferably, the first spectral distribution of the electromagnetic radiation given off by the radiation source corresponds to a spectral distribution with a main emission and at least one auxiliary emission. A second spectral distribution preferably corresponds to the first spectral distribution but without having the at least one auxiliary emission. Preferably, the first spectral distribution is ascertained by measuring, e.g. by means of spectrometer, the radiation source or with the aid of associated data sheets. The second spectral distribution can then be derived from the first spectral distribution by eliminating the auxiliary emission. With the aid of the first and/or second spectral distribution a particularly reliable and precise correction of the sensor signals can be achieved in particular with respect to disturbing influences due to auxiliary emissions.

According to a further preferred configuration of the invention the corrected sensor signals are calculated by multiplying the generated sensor signals R with a correction matrix B. In doing so, the vector R is formed by the intensity values respectively measured with the n radiation sources at a location. Consequently, each signal component $R_k$ of the vector R corresponds to the intensity upon measurement with the respective radiation source k=1 . . . n.

The correction matrix B is derived from the at least one discrete spectral distribution $S_{ki}$, with k=1 . . . n and i=1 . . . m, from the electromagnetic radiation of a first number n of radiation sources at a second number m of discrete wavelengths $\lambda_i$ and from at least one spectral pattern $D_i$ of the sensitivity of the at least one sensor for electromagnetic radiation. The correction matrix B has at least one non-diagonal element different from 0. Thus, upon the calculation of the corrected sensor signals BR there is always formed at least one linear combination from the sensor signals' $R_k$ components assigned to different radiation sources. This linear combination is non-trivial, i.e. altogether at least two coefficients are unequal to 0, so that a sum or difference is formed of at least two different components of the sensor signals $R_k$ (with k=1 . . . n).

Preferably, the correction matrix B here corresponds to the product $B=A_0A^+$ of a second matrix $A_0$ and pseudoinverse $A^-$ of a first matrix A describing the sensor system, the matrix elements $A_{ki}$ of which are given by the product of the first spectral distribution $S_{ki}$ of the electromagnetic radiation given off by the n radiation sources at m discrete wavelengths $\lambda_i$ with the spectral pattern $D_i$ of the sensitivity of the at least one sensor and a wavelength distance value Δλ between respectively two discrete wavelengths λi: is $A_{ki}=S_{ki}$ $D_i$ Δλ. Preferably, the matrix elements $A_{0ki}$ of the second matrix $A_0$ correspond to the product of the second spectral distribution $S'_{ki}$ of the electromagnetic radiation, from which the at least one auxiliary emission was eliminated, with the spectral pattern $D_i$ of the sensitivity of the at least one sensor and the wavelength spacing value Δλ between respectively two discrete wavelengths $\lambda_i$: $A_{0ki}=S'_{0ki}$ Di Δλ. By multiplying the sensor signals R with the correction matrix B the influence of the spectral behavior of the radiation sources, in particular of auxiliary emissions, on the sensor signals can be corrected with particularly high accuracy.

Alternatively or in addition to the preferred configurations described above, the at least one spectral property of the electromagnetic radiation of the radiation sources is given by at least one parameter which characterizes one or several spectral portions, in particular the intensity, of the electromagnetic radiation of the radiation source, in particular at one or several wavelengths or wavelength regions. Preferably, in the parameter there can be additionally taken into account the sensitivity of the respective sensor in particular at the mentioned wavelengths or wavelength regions. Then, the parameter preferably corresponds to a product of the intensity of the radiation emitted by a radiation source at a particular wavelength and the sensitivity of the respective sensor at this wavelength. Alternatively or additionally, the at least one parameter can also be derived from two or several intensity values and, where applicable, sensor sensitivity values at respectively different wavelengths, for example by forming a quotient. By using one or several such parameters the relevant spectral properties of the radiation sources can be easily taken into account upon the correction of the sensor signals, so that even with spectral reflection or transmission curves in a wide spectral region, e.g. between 400 and 1100 nm, relatively low computing capacities are sufficient for enabling a real-time correction of the sensor signals.

Preferably, at least one first parameter $a_1$ characterizes the spectral portion of a main emission of the electromagnetic radiation of the radiation source and at least one second parameter $a_2$ the spectral portion of an emission occurring in addition to the main emission, a so-called auxiliary emission, of the electromagnetic radiation of the radiation source. It is further preferred to configure the evaluation device in such a way that the corrected sensor signals are derived from the sensor signals taking into account the first and second parameter $a_1$ and $a_2$ or a parameter a derived from the first and second parameter $a_1$ and $a_2$, which parameter a corresponds in particular to the quotient $a_1/a_2$ of the first and second parameter $a_1$ or $a_2$. Preferably, in doing so, the sensor signals $r_1/w_1$ which are corrected ($r_1$) and preferably normalized to a white reference ($w_1$) are calculated from the measured sensor signals R, from the preferably normalized value $r_2/w_2$ of the radiation actually remitted or transmitted from the value document in the region of the auxiliary emission, and from the correction parameter $a=a_1/a_2$, with the aid of the equation $$\frac{r_1}{w_1} = (1+a)R - ar_2 = (1+a)R - a\frac{r_2}{w_2},$$

and the correction parameter a being directly obtainable by measuring the spectral distribution of the light given off by the radiation sources and the detector sensitivity. Alternatively, this can also be calculated from the measured sensor signal R and the values $r_1$ and $r_2$ obtained by means of spectrometer measurement in a calibrating document, according to $$a = -\frac{r_1 - R}{r_2 - R}.$$

In an already mentioned, particularly preferred implementation, the corrected sensor signals are normalized with the aid of corrected reference signals, the corrected reference signals being derived from reference signals generated by the at least one sensor upon the capture of the electromagnetic radiation emanating from a reference document, a so-called white reference, taking into account the at least one spectral property of the electromagnetic radiation of the at least two radiation sources. Preferably, upon the derivation of the corrected reference signals from the reference signals there is taken into account the sensitivity of the at least one sensor for electromagnetic radiation, in particular in the form of at least one spectral pattern of the sensitivity. The corrected reference signals used upon the normalization of the corrected sensor signals are thus preferably corrected analogously to the sensor signals. The explanations hereinabove and stated advantages in connection with the correction of the sensor signals apply accordingly to a respective correction of the reference signals.

BRIEF DESCRIPTION OF THE DRAWINGS

Further advantages, features and application possibilities of the present invention will result from the subsequent description in connection with the figures.

DETAILED DESCRIPTION OF VARIOUS EMBODIMENTS

Figure 1:
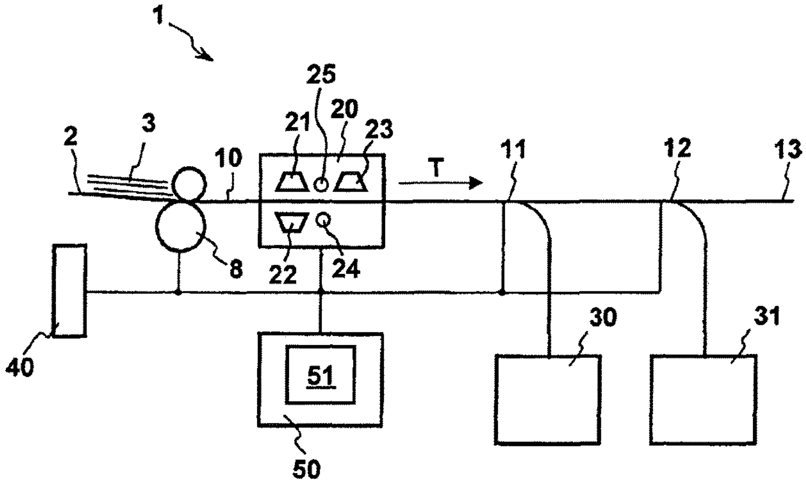
FIG. 1 shows an example of a schematic construction of a value-document processing system.

FIG. 1 shows an example of a schematic construction of a value-document processing system 1 having an input pocket 2 in which a stack of value documents, in particular bank notes 3, to be processed is supplied, and a singler 8 by which the respective lowermost bank note of the inputted stack is grasped and delivered to a transport device 10—rendered only schematically in the chosen representation—which conveys the bank note in the transport direction T to a sensor device 20.

The sensor device 20 in the represented example comprises light sources 24 and 25—represented only very schematically—for irradiating the bank note with light, in particular in the visible and/or infrared and/or ultraviolet spectral region, as well as a first, second and third sensor 21, 22 or 23 which is respectively preferably configured as a so-called line-scan camera and captures light emanating from the bank note by means of sensor elements arranged along a line, in particular in the visible and/or infrared and/or ultraviolet spectral region, and converts it into corresponding sensor signals.

As light sources 24 and 25 there are preferably used light-emitting diodes (LEDs). Although, in the represented example two light sources 24 and 25 are indicated, it may be preferred to provide more than two light sources. Instead of LEDs, there can also be used any other light sources, such as fluorescent lamps, flashbulbs, (filtered) incandescent lamps, or the like, for the inventive method.

In principle, the at least two light sources can also be realized by a light source in conjunction with at least one connectable filter, provided that at least two individually addressable, differing spectra are made available thereby. In the further description, this constellation is further described as two light sources or several light sources.

Preferably, the sensor device 20 has several light sources which emit light in different spectral regions. In particular, the respective spectral regions of the light sources can be selected in such a way that together they emit light in the spectral region in which the remission or transmission behavior of the bank note is to be checked. Preferably, this spectral region is between about 350 and 1100 nm. For example, three LEDs can be combined which respectively emit light in the ultraviolet, visible and near-infrared spectral region.

In the represented example, the first and second sensors 21 and 22 capture light remitted, i.e. diffusely reflected, and/or directly reflected, by the front side or back side of the bank note and convert it into corresponding sensor signals. The third sensor 23 located in the region of the front side of the bank note, however, captures light given off by a light source 24 and impinging on the bank note preferably obliquely and passing through it, i.e. transmitted light, and converts it into respective sensor signals.

Preferably, the line with the sensor elements of the respective sensors 21, 22 or 23 extends substantially perpendicular to the transport direction T of the bank notes, so that with every read-out operation of the sensor line of the respective sensors 21, 22 or 23 there is obtained a sensor signal pattern along the sensor line, which corresponds to an intensity pattern of the light which is transmitted or remitted by the bank note in a direction extending perpendicular to the transport direction T.

The shown sensor device 20 is preferably configured to check remission curves and/or transmission curves at different places of a bank note. For this purpose, respectively one place of the bank note is illuminated with light from one of the light sources 24, 25 with a particular wavelength and the light remitted or transmitted by the bank note is detected with one of the sensors 21, 22 or 23 and converted into respective sensor signals. Preferably, these sensor signals are then respectively divided by reference signal ascertained with the aid of a white reference, thereby at the wavelength $\lambda$ a normalized remission value or transmission value being obtained at that place of the bank note.

Preferably, the bank note is illuminated successively with light of different wavelengths and the respectively remitted or transmitted light is captured. In another embodiment also several, up to (n−1) light sources can be active simultaneously.

The light sources 24 and 25 are clocked so fast here that the bank note has hardly moved during one cycle in which all different wavelengths are switched through, in spite of the transport, so that for all the different wavelengths the measurement is performed at substantially the same place of the bank note. In this way, for this place there is not only obtained a remission value or transmission value, where applicable normalized, but a remission curve or transmission curve, where applicable normalized.

The sensor signals, in particular the corresponding remission or transmission curves, generated by the sensors 21 to 23 of the sensor device 20 are forwarded to a control device 50 and an evaluation device 51. The evaluation device 51 can be contained in the control device 50 or else form a unit separate from the control device 50. The evaluation device (51) has in particular a memory function for the provision of correction parameters calculated in advance, which are used for the calculation of corrected sensor signals.

In the evaluation device 51 the sensor signals, in particular the remission or transmission curves, are utilized for checking the bank note, from the respective sensor signals there being derived statements about various properties of the respective bank note, such as e.g. authenticity, degree of soiling, wear, defects, and the presence of foreign objects, such as e.g. adhesive tape. Depending on the properties of the respective bank note that are ascertained in the evaluation device 51, the transport device 10 as well as the gates 11 and 12 along the transport line are controlled by the control device 50 such that the bank note is fed to one of a plurality of output pockets 30 and 31 and deposited there. For example, bank notes that were recognized as authentic are deposited in a first output pocket 30, while bank notes classified as false or suspect are placed in a second output pocket 31. The reference number 13 at the end of the represented transport line is intended to indicate that there can be provided further output pockets and/or other devices, for example for storing or destroying bank notes. If the check of a bank note yields for example that it is authentic, but does not meet certain fitness criteria with regard to soiling, wear, defects or the presence of foreign objects, it can be fed directly to a shredder for destruction.

The value-document processing system 1 further comprises, in the represented example, an input/output device 40 for inputting data and/or control commands by an operating person, for example by means of a keyboard or a touchscreen, and outputting or displaying data and/or information about the processing operation, in particular about the respectively processed bank notes.

In the evaluation device 51, corrected sensor signals, in particular respective corrected remission or transmission curves, which reproduce the actual remission or transmission behavior of the bank note substantially more precisely than the uncorrected remission or transmission curves, are preferably utilized for checking the bank note. This is explained in more detail in the following.

Figure 2:
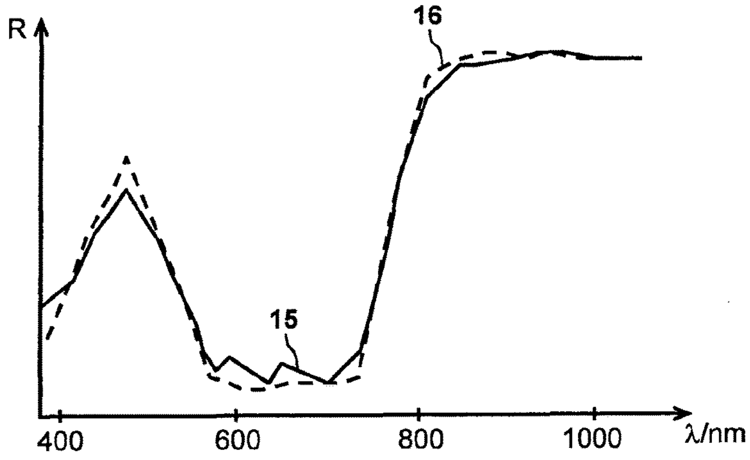
FIG. 2 shows examples of a uncorrected remission curve and a remission curve measured with a spectrometer.

FIG. 2 shows an uncorrected remission curve 15 in the spectral region between about 400 and 1050 nm which was obtained with the sensor device 20 in comparison with a remission curve 16 measured with a calibrated spectrometer which reproduce the actual remission behavior of the viewed place of the bank note. As indicated by the comparison, the uncorrected remission curve 15 shows remarkable artifacts which in this example appear as pointed remission peaks at about 590 nm and about 650 nm. As tests have surprisingly shown, these remission peaks occur in spite of a normalization of the remission curve 16 by means of reference signals which were ascertained at a white reference.

With the invention it is achieved, among other things, that such remission peaks are eliminated from the remission curve 15 or are at least significantly reduced, so that the corrected remission curve obtained therefrom comes substantially closer to the actual remission curve 16.

Figure 3:
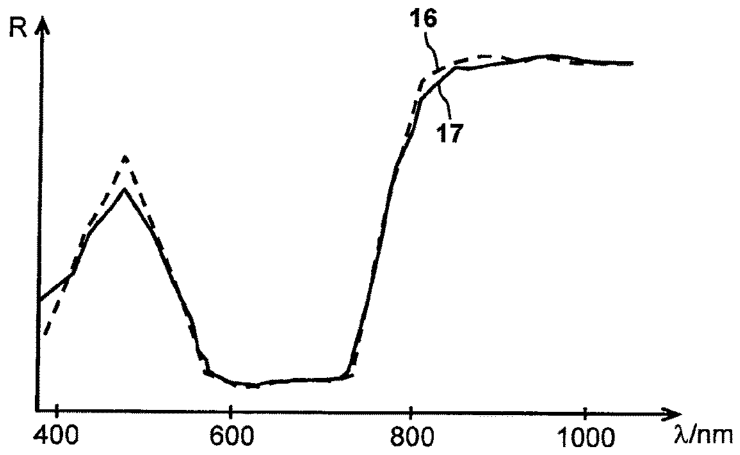
FIG. 3 shows examples of a corrected remission curve and a remission curve measured with a spectrometer.

FIG. 3 shows a remission curve 17, which was corrected according to the invention, in the spectral region between about 400 and 1050 nm in comparison to the remission curve 16 measured with a spectrometer. As indicated by the diagram, the pattern of the corrected remission curve 17 matches considerably better with the pattern of the remission curve 16 measured with the spectrometer than is the case with the uncorrected remission curve 15 (cf. FIG. 2).

Ideally, the spectral illumination distributions of LEDs correspond to laser-like Dirac-functions at the corresponding wavelengths, i.e. they have a "needle-shaped" spectral intensity distribution of the emitted light around a nominal wavelength. But as this is often not the case in practice, the remission curves obtained by means of LED illumination of bank notes are somewhat falsified. Thus, the spectral illumination distributions of real LEDs normally have a certain extent around the nominal wavelength, so that the remission spectrum is somewhat smoothed. This emission of light in connection with the invention is also referred to as a main emission. In addition, it has turned out that some LEDs also show, besides the main emission, auxiliary emissions in completely different wavelength regions, which alter the form of the remission curve in a surprisingly striking and particularly disturbing manner.

The approach according to the invention for correcting the remission or transmission curves is based on the finding that disturbing artifacts, in particular remission or transmission peaks, can be caused by auxiliary emissions of the respective light sources, in particular LEDs. The preferred correction methods for the calculated elimination or at least reduction of these effects are explained in more detail in the following.

In a simple numerical correction method, the original remission or transmission curves can be easily smoothed in the region of the wavelengths of LEDs with auxiliary emissions, e.g. with a sliding mean value over three intermediate points. Although the representation of the curves is smoothed in a simple and fast manner hereby, there are possibly generated also new artifacts, in particular in the case of strongly structured remission or transmission spectra with steep flanks.

So as to achieve a better approximation of the remission or transmission curves to the actual remission curves 16 (see FIGS. 2 and 3) or transmission curves, there is preferably employed a correction method which takes into account physical properties of the emission, remission or transmission and detection processes. This model is explained by way of example for remission measurement, but can, of course, also be employed in a completely analogous manner for transmission measurements.

With the help of this model, knowing the illumination distributions and the detector sensitivity distribution for all LEDs, the generated sensor signals for a remission curve are simulated. As explained above, the sensor device 20 captures the main emissions as well as the auxiliary emissions of the light sources 24, 25 and the remission and transmission caused thereby.

The sensor signal $I_k$, which is generated upon an illumination of a bank note with the $k^{th}$ LED (k=1 . . . n), is subject to the formula $$I_k = \int S_k(\lambda) D(\lambda) r(\lambda) d\lambda,$$

wherein $S_k(\lambda)$ is the illumination distribution of channel k, i.e. of the $k^{th}$ LED, $D(\lambda)$ the detector sensitivity, i.e. the sensitivity of the sensor, and $r(\lambda)$ the actual remission curve of the bank note.

When $S_k(\lambda)$ would be a Dirac function at the place $\lambda_k$, it would hold that $$I_k=\int D(\lambda_k)r(\lambda_k),$$

i.e. the obtained sensor signal $I_k$ would correspond to the actual remission $r(\lambda_k)$ except for to the calibrating factor $D(\lambda_k)$. As in the case of a white balance this calibrating factor would be cancelled, with an illumination distribution in the form of Dirac functions one would thus obtain the precise remission values.

In concrete applications, $r(\lambda)$ can often be at discrete, equidistant wavelengths $\lambda_i$ (i=1 . . . m). Accordingly, also $S_k(\lambda)$ and $D(\lambda)$ for these wavelength values $\lambda_i$ are to be determined, where applicable by interpolation.

With the definitions $S_{ki}=S_k(\lambda_i)$, $D_i=D(\lambda_i)$ and $r_i=r(\lambda_i)$, it holds that $$I_k=\sum_{i=1}^{m} S_{ki}D_i r_i\Delta\lambda$$

With $A_{ki}=S_{ki}D_i\Delta\lambda$ it holds that $$I_k=\sum_{i=1}^{m} A_{ki}r_i$$

With the notations $$I=(I_k),A=(A_{ki}),r=(r_i)$$

one obtains/as a matrix multiplication of r with A $$I=Ar.$$

The vector I is preferably normalized by a white balance. For this, $$\frac{Ar}{Aw}$$

is calculated, wherein $$w=(w_i)=(w(\lambda_i))$$

corresponds to the actual remission curve of a so-called white reference, i.e. a reference having equally high remission values near 1 in the respectively viewed spectral region.

Taking into account this model, a correction of the generated sensor signals, i.e. of the measured remission curves, can then be performed as follows.

$A_0$ be the matrix analogous to A, which is obtained when in the sensitivity curve $S_{ki}=S_k(\lambda_i)$ any auxiliary emissions in the data record are removed. With a sensor having corresponding LEDs, the actual remission curve $$\frac{A_0 r}{A_0 w}$$

would then be obtained.

Figure 5:
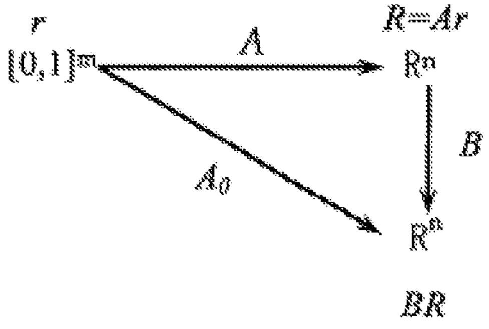
FIG. 5 shows an example of a commutative diagram of illustration.

For the present model and the correction method to be derived therefrom the commutative diagram illustrated in FIG. 5 holds.

Here, the remission vector r with the discretization at m wavelengths is mapped either without auxiliary emissions with $A_0$ onto the (correct) sensor signals BR in the n radiation channels, or alternatively over the measurement with auxiliary emissions (R) and the following correction thereof over the correction matrix B. Here, B is defined as $B=A_0A^+$, $A^+$ being the pseudoinverse of A. For the case n=m, $A^-=A^{-1}$ is the inverse of the matrix A.

According to a mathematical definition, a pseudoinverse $A^+$, which can also be referred to as a generalized inverse, of A is herein the case exactly when it holds that:

$$AA^+A=A \text{ and } A^+AA+=A^+,$$

With the sensors 21, 22 the sensor signals R=Ar and W=Aw are obtained. Without a correction according to the invention one would calculate R/W. With correction, however, BR/BW is calculated. In the case of m=n the result is $$\frac{BR}{BW}=\frac{A_0A^{-1}Ar}{A_0A^{-1}Aw}=\frac{A_0 r}{A_0 w},$$

i.e. the correct and thus actual remission values. In the case of m n, with the help of the pseudoinverse one obtains an approximation of $$\frac{A_0 r}{A_0 w} \text{ by } \frac{BR}{BW}.$$

In a development of this method it may be provided that upon the preparation of $A_0$ not only the auxiliary emissions of the LEDs are removed, but in addition their Gauss-like or even unsymmetrical distributions are replaced with discrete Dirac functions in the entries for the respective wavelength region. This achieves the advantage that the edges of the remission curves become steeper and thus more precise.

Altogether, the described correction method allows a reliable elimination or at least reduction of remission or transmission peaks due to auxiliary emissions of the light sources, so that this method can be utilized—particularly in sensor and/or evaluation devices with a sufficiently high computing power—in an advantageous manner. A spectral correction is effected here under a change of the form of the remission spectrum. This correction is dynamic, i.e. the correction parameter does not only depend on the systematic (static) alternating disturbances among the radiation source channels, but also on the currently measured values of the radiation source channels involved.

In a preferred variant of this method, a reliable correction of the sensor signals can be performed even with lower computing capacities on a real-time basis. For this, for irradiating the bank note there are used such LEDs which respectively have at most one auxiliary emission which is preferably near a wavelength at which one or several of the respective other LEDs is or are available which for its or their part preferably has or have no auxiliary emission.

In a preferred case, the wavelength of the main emission of the other LED is offset by less than 120 nm from the wavelength of the auxiliary emission of the first LED, more preferably by less than 50 nm, even more preferably by less than 10 nm, depending on the desired spectral resolution of the transmission or remission curves and the number of light sources.

If one first views the ideal case that the illumination distribution is approximately a narrow Gauss curve around the wavelength $\lambda_k$ without auxiliary emissions. Then one obtains approximately $$(I_k)=a_k r(\lambda_k),$$

with a weighting factor of $a_k$. If the remission is measured relative to a white reference, i.e. is normalized by means of reference signals obtained with the aid of the white reference, the weighting factor $a_k$ is cancelled:

$$\frac{a_k r(\lambda_k)}{a_k w(\lambda_k)} = \frac{r(\lambda_k)}{w(\lambda_k)} = \frac{r_k}{w_k}$$

Figure 4:
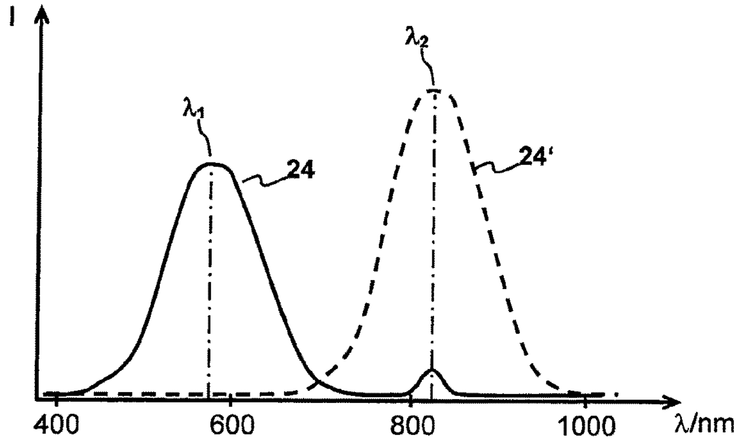
FIG. 4 shows examples of the emission of different light sources.

In FIG. 4 the intensity I of the emission of two light sources 24, 24' is represented by way of example. For the correction of the first light source 24 having a first main emission with a wavelength $\lambda_1$ and a first auxiliary emission with a wavelength $\lambda_2$ the second light source 24' is required which has a main emission with a wavelength identical with or similar to the wavelength $\lambda_2$ of the auxiliary emission of the first light source 24 to be corrected. For LEDs with a main emission at 570 nm it has turned out, for example, that there is often an auxiliary emission at 850-870 nm. Therefore, for the correction a second LED is used, which has a main emission at approx. 850 nm. In this simplest case that a light source 24 has a main emission at a wavelength $A_1$ and only one auxiliary emission at a second wavelength $\lambda_2$ one obtains instead of the actual normalized remission value $r_1/w_1$ the quotient $$R = \frac{a_1 r_1 + a_2 r_2}{a_1 w_1 + a_2 w_2} = \frac{r_1 + \frac{a_2}{a_1} r_2}{w_1 + \frac{a_2}{a_1} w_2}.$$

With $a_2/a_1=a$ and the assumptions $w_1=w_2=1$ one obtains $$R = \frac{r_1 + a r_2}{1 + a}.$$

Therefrom results as a correction $$r_1 = (1+a)R - a r_2 = (1+a)R - a\frac{r_2}{w_2}.$$

From the remission R obtained by means of sensors, the unfalsified, i.e. actual, value $r_2/w_2$ and the correction parameter a one can calculate the corrected, i.e. actual, value $r_1/w_r$ of the normalized remission.

The correction parameter $a-a_2/a_1$ is preferably determined with the aid of two methods.

In the first method, the $a_i$ are determined directly via the product of the measured spectral distributions of the light emission of the light source 24 and the measured sensitivity of the detector or the detectors at the wavelength $\lambda_i$. In this case the intensities of the main and auxiliary emission of the first light source 24 with the auxiliary emission and the detector sensitivities must be measured at the wavelengths $\lambda_1$ and $\lambda_2$. The intensity of the further light source 24' which with its main emission emits in the region of $\lambda_2$ does not necessarily have to be measured.

In the second method which is simpler in terms of measurement technology and more precise, no direct measurements of the intensities of the light sources or detector sensitivities are required. Here, the correction parameter a is calculated from the known quantities R (sensor signals, normalized where applicable) and the actual remission $r_1$, $r_2$ of a test sample characterized in advance:

$$a = -\frac{r_1 - R}{r_2 - R}.$$

The actual remission of the test sample may be known by using standard color charts, or be determined by a direct measurement with a spectrometer at the test sample. The test sample here preferably has sufficiently high remission values >0.2, particularly preferred >0.5, so that sufficiently high signal intensities and thus a sufficient accuracy is achieved upon the determination of a.

In the general case of several light sources with several auxiliary emissions, likewise the first method can be employed for determining the correction matrix B: In doing so, via measurements of the light emissions of the $k^{th}$ light source there is successively determined the $S_{ki}$ for every wavelength $\lambda_i$ and with the associated detector sensitivity Di the matrix entries $A_{ki}=S_{ki}\,D_i\Delta\lambda$ are calculated. Subsequently, the associated adjusted matrix $A_0$ is defined and the correction matrix $B=A_0A^+$ is calculated.

Alternatively or additionally to the above-described methods, the invention also comprises the variants and implementations set forth in the following.

The spectral illumination contributions may not only come from the main and auxiliary emissions of individual light sources, but may also be due to a simultaneous illumination of the value document with at least two light sources having different spectral distribution. The correction of the sensor signals according to the invention via the algorithm according to the invention enables a correct extraction of the remission or transmission curves in this case as well.

In a variant, a bank note is first illuminated with two different LEDs (LED A and LED B) simultaneously and then only with one of the two LEDs, e.g. LED B, so that when then the difference A=(A+B)−B is taken one can infer the signal which would have been obtained with an illumination with LED A alone.

In a preferred special case of this variant, LED A emits light in the UV region, LED B in the visible (VIS) or IR region. Then, the UV signal can be ascertained without a sole irradiation of the bank note by the UV LED being required.

In a further variant, the sensor device 20 is arranged such that the bank note is irradiated always simultaneously with LEDs of different wavelength regions. For example, one can illuminate the bank note simultaneously with the different overlappings of LEDs A+B+C, of LEDs A+B, and of LEDs A+C successively.

For correcting the sensor signals, the algorithm according to the invention can then be employed as described above, when the spectra of the individual LED light emissions are used through the spectra of the $k^{th}$ combined LED overlappings. In doing so, the $S_{ki}$ for each wavelength $\lambda_i$ again are determined successively and with the associated detector sensitivity Di the matrix entries $A_{ki}=S_{ki}\,D_i\,\Delta\lambda$ are calculated. Subsequently, the associated adjusted matrix $A_0$ is defined and the correction matrix $B=A_0A^+$ is calculated.

The invention claimed is:

1. An apparatus for checking value documents, comprising:

at least two radiation sources for giving off electromagnetic radiation with which a value document is irradiated, at least one sensor for capturing the electromagnetic radiation emanating from the value document, reflected and/or transmitted by the value document, and generating corresponding sensor signals, with components assigned to the radiation sources, and an evaluation device which is configured to derive from the sensor signals corrected sensor signals taking into account at least one spectral property of the electromagnetic radiation of the at least two radiation sources, wherein upon the derivation of the corrected sensor signals there is formed at least one linear combination from the sensor signals' components assigned to different radiation sources.

2. The apparatus according to claim 1, wherein the at least one spectral property of the electromagnetic radiation of the at least two radiation sources is given by at least one spectral distribution of the electromagnetic radiation of at least one radiation source.

3. The apparatus according to claim 2, wherein the at least one spectral distribution of the electromagnetic radiation of at least one of the at least two radiation sources is given by a first spectral distribution of the electromagnetic radiation given off by at least one of the at least two radiation sources and by a second spectral distribution of the electromagnetic radiation which is different from the first spectral distribution.

4. The apparatus according to claim 3, wherein the first spectral distribution corresponds to a spectral distribution of the electromagnetic radiation with a main emission and at least one auxiliary emission given off by at least one of the at least two radiation sources and the second spectral distribution corresponds to the first spectral distribution without the at least one auxiliary emission.

5. The apparatus according to claim 4, wherein the wavelength of the main emission of a second radiation source is offset by less than 120 nm from the wavelength of the auxiliary emission of a first radiation source.

6. The apparatus according to claim 2, wherein the evaluation device is configured to ascertain the corrected sensor signals by a multiplication of the sensor signals with a correction matrix which is derived from the at least one spectral distribution of the electromagnetic radiation of a first number of radiation sources at a second number of discrete wavelengths and at least one spectral pattern of the sensitivity of the at least one sensor for electromagnetic radiation, and wherein the correction matrix has at least one non-diagonal element different from 0.

7. The apparatus according to claim 6, wherein the spectral distributions of the electromagnetic radiation of the individual radiation sources are not all identical or are not all different.

8. The apparatus according to claim 6, wherein the correction matrix corresponds to the product of a second matrix and a pseudoinverse of a first matrix, wherein the matrix elements of the first matrix correspond to the product of the first spectral distribution of the electromagnetic radiation given off by first number of radiation sources at a second number of discrete wavelengths, with the spectral pattern of the sensitivity of the at least one sensor, and a wavelength spacing value between respectively two discrete wavelengths.

9. The apparatus according to claim 8, wherein the matrix elements of the second matrix correspond to the product of a second spectral distribution of the electromagnetic radiation with the spectral pattern of the sensitivity of the at least one sensor and a wavelength spacing value between respectively two discrete wavelengths.

10. The apparatus according to claim 1, wherein the at least one spectral property of the electromagnetic radiation of the radiation source is given by at least one parameter which characterizes one or several spectral portions of the electromagnetic radiation of the radiation source.

11. The apparatus according to claim 10, wherein at least one first parameter characterizes the spectral portion of a main emission of the electromagnetic radiation of the radiation sources and at least one second parameter the spectral portion of an auxiliary emission of the electromagnetic radiation of the radiation sources.

12. The apparatus according to claim 11, wherein the evaluation device is configured to derive the corrected sensor signals from the sensor signals taking into account the first and second parameter or a parameter derived from the first and second parameter, which parameter corresponds to the quotient from the first and second parameter.

13. The apparatus according to claim 12, wherein the evaluation device is configured to further take into account a value when deriving the corrected sensor signals from the sensor signals, which value represents a measure for the electromagnetic radiation emanating from the value document, reflected and/or transmitted from the value document, in the region of the auxiliary emission of the electromagnetic radiation of the radiation source.

14. The apparatus according to claim 1, wherein the evaluation device is configured to normalize the corrected sensor signals with the aid of corrected reference signals, wherein the corrected reference signals are derived from reference signals which are generated by the at least one sensor upon capturing the electromagnetic radiation emanating from a reference document, taking into account the at least one spectral property of the electromagnetic radiation of the at least two radiation sources.

15. The apparatus according to claim 14, wherein the evaluation device is configured to take into account, upon deriving the corrected reference signals from the reference signals, the sensitivity of the at least one sensor for electromagnetic radiation, in the form of a spectral pattern of the sensitivity of the at least one sensor.

16. The apparatus according to claim 1, wherein the evaluation device includes a memory function for the provision of correction parameters calculated in advance.

17. A value-document processing system having at least one apparatus for processing, conveying and/or counting and/or sorting, value documents, and having an apparatus for checking value documents according to claim 1.

18. A method for checking value documents, comprising the following steps:

irradiating a value document with electromagnetic radiation of at least two radiation sources, capturing the electromagnetic radiation emanating from the value document, reflected and/or transmitted by the value document, and generating corresponding sensor signals, with components assigned to the radiation sources, and deriving corrected sensor signals from the sensor signals taking into account at least one spectral property of the electromagnetic radiation of the at least two radiation sources, wherein upon deriving the corrected sensor signals there is formed at least one linear combination from the sensor signals' components assigned to the different radiation sources.

* * * * *